Patented July 14, 1942

2,289,775

UNITED STATES PATENT OFFICE 2,289,775

PROTEIN-POLYAMIDE MIXTURE

George De Witt Graves, Wilmington, Del., assignor to E. I. du Pont de Nemours & Company, Wilmington, Del., a corporation of Delaware No Drawing. Application June 14, 1940, Serial No. 340,619

13 Claims. (Cl. 260—6)

This invention relates to new compositions of matter and more particularly to compositions comprising proteins.

A number of protein materials have been used as adhesives, plastics, and for other purposes, but their use in films, fibers, and coating compositions has been limited by certain inherent deficiencies, including brittleness, lack of flexing or folding endurance, poor resistance to outdoor exposure, and low strength. Attempts to overcome the inherent brittleness of protein films and coatings by the incorporation of plasticizing agents have not hitherto proved entirely successful, since with the known plasticizing agents the films or coatings, while pliable when freshly prepared, become brittle in a relatively short time. Most plasticizers, moreover, are relatively ineffective at low humidity since their plasticizing action for proteins depends wholly or in large part upon humectant action. Previous attempts to improve the properties of proteins as film-forming materials have met with but indifferent success due to the fact also that but few film-forming or polymeric materials are satisfactorily compatible with proteins, and due to the fact that the compositions that have been proposed yield products deficient in the above mentioned properties. Because of their low cost, proteins would also be a desirable constituent of artificial fibers but fibers obtained from proteins and from protein compositions previously proposed lack the strength and pliability required to compete with natural fibers.

This invention has as an object the preparation of compositions which contain protein material in substantial amount and which possess to a high degree the properties of strength, resistance to flexing, and pliability. A further object is the production of protein compositions yielding with or without the use of plasticizers, films which retain their flexibility and other desirable properties for a long period of time. A further object is the manufacture of strong and pliable filaments and fibers which contain protein material as an essential and substantial constituent. A still further object is the preparation of new and useful compositions of matter. Other objects will appear hereinafter.

I have discovered that protein materials are compatible with the synthetic linear polyamides, and that from intimate mixtures of these polyamides and proteins there may be obtained strong and flexible films and fibers which retain their flexibility for long periods of time, even when subjected to outdoor exposure. These compositions may also be used in solutions to obtain valuable decorative or coating films. From these compositions there may be obtained strong self-supporting films which are a valuable feature of my invention since from among the large number of film-forming materials but very few are capable of being used as substantial constituents of strong durable self-supporting films.

A convenient method for carrying out my invention consists in forming the intimate mixture of a protein and polyamide by blending the two components by means of solvents. A preferred method consists in dissolving the protein and polyamide in a common solvent or blending solutions of the two components in the common solvent.

The polyamides used in the practice of this invention are of the general type described in Patents 2,130,523, 2,130,948 and 2,176,074. The term polyamide as used herein refers to the synthetic linear polymers which contain amide or thioamide groups in the main chain of atoms. This class of polymeric substances includes simple polyamides, interpolyamides, ester-amide interpolymers, polycarbamates, polyureas, and their corresponding sulfur analogs, as described in the above references.

The simple polyamides, those derived from a single diamine and a single dicarboxylic acid or dithiocarboxylic acid, or from a single amino acid, in general have a microcrystalline structure and are capable of being formed into fibers showing by X-ray examination orientation along the fiber axis. When polyamides of this kind are used they are preferably those readily soluble in aqueous inorganic acids, such as concentrated hydrochloric acid; in organic acids, such as formic and acetic acid; in phenols, such as the cresols; and in saturated solutions of calcium chloride in methanol. Certain simple polyamides, especially those containing ether groupings in the main chain of atoms, show a wider range of solubility. Polytriglycol adipamide, for instance, dissolves readily in water and in the lower alcohols. Simple polyamides containing lateral substituents in either the acid or amine residue, or both, show improved solubility in many solvents. Thus, for example, polyhexamethylene 3-tertiary-butyladipamide is readily soluble in aqueous ethanol and chloroform-methanol mixtures. It is to be understood that the dibasic acids and amino acids mentioned above may be replaced by their equivalent amide-forming derivatives.

Another type of polyamide particularly useful for the present purpose comprises the interpolyamides, since these polyamides are in general more soluble than the simple polyamides. Many members of this class are soluble in mixtures of chloroform and methanol, mixtures of trichloroethylene and ethanol, mixtures of alcohols and water, and in some cases in water alone. These polyamides are derived from a number of polyamide-forming reactants in excess of the number required to form a simple polyamide, the free amino and carboxylic acid groups, or their amide-forming equivalents, being present in the reactants in substantially equimolecular quantities. Thus, for example, interpolyamides can be prepared from one or more diamines and two or more dibasic carboxylic acids; from two or more diamines and one or more dibasic carboxylic acids; from one or more diamines, one or more dibasic carboxylic acids, and one or more polyamide-forming amino acids; or from two or more polyamide-forming amino acids, provided that in each of these cases free amino groups and carboxylic acid groupings, or their amide-forming equivalents, are present in substantially equimolecular amounts in the reactants.

The water-soluble interpolyamides, as for instance the interpolymers prepared from triglycoldiammonium adipate and up to 20% hexamethylenediammonium adipate, are especially useful in preparing the new protein compositions described herein. Another particularly valuable type of interpolyamide, due to its high degree of compatibility with plasticizing agents, is that derived from at least one diamine, at least one dibasic carboxylic acid, and at least one amino acid. Interpolyamides derived from hexamethylene diammonium adipate and 6-aminocaproic acid or its amide-forming derivatives such as epsilon-caprolactam, from hexamethylene diammonium adipate, 6-aminocaproic acid and 12-aminostearic acid, from hexamethylene diammonium adipate, hexamethylene diammonium sebacate, and 6-aminocaproic acid, and from hexamethylene diammonium adipate, hexamethylene diammonium azelate and 6-aminocaproic acid are especially valuable members of this class because of their ready availability from easily prepared raw materials and their great solubility in cheap, non-toxic solvents such as mixtures of alcohols and water.

Among the various classes of proteins, the prolamins, the albumins, certain of the derived proteins, the globulins, the glutelins, and the phosphoproteins are particularly suitable for the purpose of this invention. Zein is a typical prolamin, or alcohol-soluble protein, and dissolves readily in aqueous alcohol, in chloroform-methanol mixtures, and in a saturated solution of calcium chloride in methanol. The albumins, of which blood albumin is a typical example, and certain of the derived proteins, such as gelatin, are soluble in water without the addition of other solubilizing agents. The globulins, as a class, are soluble in dilute salt solutions, dilute alkalies, and strong acids. Soya protein, the protein material from soybeans, consists chiefly of glycinin, a typical globulin. Soya protein is also soluble in phenols such as the cresols and phenol itself. The glutelins are the alkali-soluble proteins obtained from vegetable seeds and are insoluble in water, dilute salt solutions, and in aqueous alcohols. Maize glutelin from corn is an example of a typical glutelin. The phosphoproteins, of which casein is a typical example, are similar to the glutelins in many of their solubility properties, being soluble in dilute alkalies, and, in addition, dissolving readily in strong acids. Of these classes of protein the prolamins or water-soluble proteins are as a rule the most advantageously used.

The new compositions of protein and polyamide claimed herein may be obtained by several methods. In the preferred method of forming a solution of the components in a common solvent, polytriglycol adipamide and gelatin, for instance, can be dissolved separately in water and the two solutions mixed by any suitable means. A water-soluble interpolyamide prepared from hexamethylenediamine, triglycoldiamine, and adipic acid can also be dissolved in water and mixed with an aqueous solution of gelatin. Zein and the interpolyamide derived from hexamethylenediamine, adipic acid, and 6-amino-caproic acid can also be blended by dissolving the components separately in alcohol-water mixtures for example, those containing 80% alcohol by weight followed by mixing in any suitable manner. Alternatively, solutions of methanol in chloroform can be substituted for the alcohol-water mixtures. Mixing of the protein from soya beans and polyhexamethylene adipamide can be effected using phenol as the common solvent. Mixtures of polyhexamethylene adipamide and casein can be effected using formic acid to dissolve both components.

The common solvent may be removed by evaporation, for example, by casting in the form of a thin film on a casting wheel. In some cases it is desirable to remove the mutual solvent by leaching, using a liquid in which both the protein and the polyamide are insoluble. It is also possible to cause solidification of the mass by simple cooling and gelation, when using a relatively small amount of high-boiling solvent which is effective only at higher temperatures. As an example of the latter case, the blending of zein and an interpolyamide derived from hexamethylenediamine, adipic acid, and 6-amino-caproic acid, utilizing amylbenzenesulfonamide as the solvent, may be cited.

It is also possible to dissolve the protein and the polyamide in two different but miscible solvents, so chosen that upon mixing of the two solutions mutual precipitation of the components occurs. Thus, for example, gelatin can be dissolved in water and an interpolyamide prepared from hexamethylenediamine, adipic acid, and 6-aminocaproic acid dissolved in aqueous alcohol. Upon mixing of the two solutions, for instance by means of two converging streams of the respective solutions, mutual precipitation of the polyamide and protein is effected.

Another method for accomplishing an intimate mixture consists in dissolving the protein and the polyamide separately in two immiscible solvents and dispersing one solution in the other. A solution of the interpolyamide derived from hexamethylenediamine, adipic acid, and 12-amino-stearic acid, dissolved in benzyl alcohol and dispersed in an alkaline casein solution is an example of the intimate mixtures obtainable by this procedure. A solid intimate mixture can be obtained from this dispersion by simple evaporation.

In the examples given below, all parts are given by weight unless otherwise indicated.

*Example I*

The following example typifies the preparation of blends of water-soluble synthetic polyamides with water-soluble proteins. The polyamide of the example is an interpolymer which contains a functional group other than a hydrocarbon radical, in this case an ether grouping, in a portion of the atom chains separating the amide groups of the molecule. The protein, gelatin, belongs to the class of derived proteins.

A 10% aqueous solution of gelatin is blended with varying proportions of a 10% aqueous solution of the interpolyamide obtained by polymerizing 90 parts of triglycoldiammonium adipate with 10 parts of hexamethylenediammonium adipate. Films cast from the resulting aqueous solutions are homogeneous, transparent, tough, and pliable. When the bursting strengths of these films are measured in a Mullin paper tester, the film composed of equal parts of polyamide and gelatin is found to have a much higher bursting strength than films composed solely of either the polyamide or of gelatin alone.

*Example II*

The following example illustrates the preparation of compositions composed of intimate mixtures of typical alcohol-soluble proteins, or prolamins, and typical interpolyamides prepared from a diamine, a dibasic acid and a polyamide-forming amino acid, in which the amide groups of the molecule are connected through chains of carbon atoms.

An interpolyamide prepared from 63.2 parts of hexamethylenediammonium adipate and 45.5 parts of caprolactam is dissolved in a mixture of 642 parts of chloroform and 183.6 parts of methanol and 69.6 parts of mixed N-ethyl toluenesulfonamides added as a plasticizing agent. This solution is added to a solution comprising 104 parts of zein dissolved in a mixture of 310 parts of chloroform and 83 parts of methanol. Films are cast from the resulting solution onto a smooth surface, e. g., an endless metal band with a polished surface, using a doctor knife to spread the solution evenly and uniformly. After drying at room temperature, the films of uniform thickness are stripped from the casting surface.

The films obtained in this manner are transparent and show a high degree of tensile strength, giving a break strength value based on break dimensions of 6,430 lbs./sq. in., when dry, as compared to 3,340 lbs./sq. in. for a plasticized zein film. After prolonged soaking in water, the strength values of these films, based on break dimensions, were 2,670 lbs./sq. in. for the polyamide-protein blend and 329 lbs./sq. in. for the protein.

When these films are subjected to outdoor exposure at the same time as plasticized films prepared in a similar way from either the interpolyamide or the protein alone, the films made from the protein-polyamide mixture are found to be definitely superior to the interpolyamide films in toughness, i. e., resistance to flexing. After six weeks exposure, the zein films become brittle and crack within a few days. Moreover, the protein-polyamide films remain flexible for periods of time greater than fifteen months under ordinary indoor conditions, whereas zein-containing films having the previously known plasticizers incorporated therein become embrittled within a period of one to two months under the same conditions.

*Example III*

The following example illustrates the preparation of fibers composed of a mixture of a typical prolamin and a typical simple polyamide.

A solution containing 13 parts of zein, 18 parts of polyhexamethylene adipamide, and 69 parts of 98% formic acid is prepared by tumbling the components at room temperature. Filaments are spun from this solution at 28° C. by passing it through a 0.006" orifice into a heated cell, evaporating the solvent while in the cell, and winding onto a motor driven bobbin. An extrusion pressure of 50 lbs./sq. in., a cell temperature of 110° C., and a windup speed of 60 ft./min. are used. The resulting filaments, after stretching to 458% of their original length, show a denier of 2.3, a residual elongation of 90%, and a tensile strength of 3.2 g. per denier at break. This latter value approaches closely typical strength values for yarns prepared in a similar manner from the polyamide alone; namely, 3.2–4.0 g. per denier at break. Filaments composed of zein alone spun in a similar manner show a tensile strength of only 0.34 g. per denier at break.

*Example IV*

The example given below illustrates the use, in the emulsion layer of a photographic film, of a homogeneous mixture of a simple water-soluble synthetic linear polyamide, containing ether groups in the main chain of atoms, and the water-soluble derived protein, gelatin.

Polytriglycol adipamide and gelatin were employed together in a photographic emulsion according to the following formula:

Solution A

| | Parts |
|---|---|
| Water | 225 |
| Ammonium bromide | 21.5 |
| Potassium iodide | 0.29 |
| Polytriglycol adipamide | 7.5 |
| Gelatin | 5 |

Solution B

| | |
|---|---|
| Water | 125 |
| Silver nitrate | 30 |
| Concentrated ammonium hydroxide—Sufficient to redissolve the precipitate initially formed, while maintaining the solution at 35° C. | |

Solution B is added to Solution A with stirring. Mixing is effected at 35° C. Gelatin, which has been swollen in cold water, to the extent of 37.5 parts is added and mixed with the solution at 35° C. After solution of the last portion of gelatin, the emulsion is coated on a suitable base, such as a glass plate or cellulose acetate film.

Photographic emulsion layers prepared in this way are superior to layers containing no polyamide as regards their resistance to mechanical shock.

*Example V*

The following example is illustrative of the preparation of protein-polyamide compositions at higher temperatures and which are solidified by cooling. The protein, zein, is a typical alcohol-soluble protein, while the polymer is a typical interpolyamide prepared from a diamine, a dibasic acid, and an amino acid.

A synthetic linear polyamide prepared from 78.5 parts of hexamethylenediammonium adipate and 52.4 parts of caprolactam is intimately mixed with 120 parts of zein and 160 parts of amylbenzenesulfonamide. The resulting mixture is heated at 157° C., in the substantial absence of oxygen, until complete mixing of the resulting solution is effected. After cooling, the solidified mass is molded in a die for 7 minutes at 115° C. and 3000 lbs./sq. in. pressure. The resulting molded product possesses a good degree of toughness and resistance to swelling by water.

Example VI

The following example illustrates the preparation of a homogeneous mixture of a scleroprotein, fibroin, with the simple polyamide, polyhexamethylene adipamide.

Five parts of fibroin from waste silk scrap is dissolved in 50 parts of a mixture of equal volumes of formic acid and concentrated hydrochloric acid. This solution is added to an equal volume of a solution prepared from 10 parts of polyhexamethylene adipamide and 58 parts of 98% formic acid. A film spread on a glass support, given a preliminary drying in a drying chamber at 45° C. and a final drying in another chamber at 100° C. is very clear, transparent, tough, and strong, even when wet.

Partial evaporation of the solvent from the above solution yields a viscous mass, which can be spun manually to fine fibers by drawing out a portion of the liquid on a glass rod and causing the final evaporation of the solvent in the air.

Example VII

The following example illustrates the preparation of a blend of a protein of the salt-soluble, or globulin, type with a simple polyamide.

One hundred twenty-five parts of polyhexamethylene adipamide is dissolved in 375 parts of a 90% solution of phenol in water. The resulting solution is mixed with a solution of 125 parts of soya protein in 375 parts of the same aqueous phenol solution. Both solutions are prepared by warming at 30–40° C. and are mixed at the same temperature. Films are cast onto a suitable support from this warm mixed solution and dried in a drying chamber at 100° C. The resulting translucent films are flexible, strong even when wet, and show improved toughness, i. e., resistance to cracking upon repeated flexing.

Example VIII

The following example illustrates compositions prepared from a typical phosphoprotein, casein, and the simple polyamide, polyhexamethylene adipamide.

A solution containing 15 parts of polyhexamethylene adipamide in 85 parts of 98% formic acid is added to a solution of 50 parts of casein in 100 parts of concentrated hydrochloric acid. The solution is cast onto a glass plate, heated in a drying chamber at 45° C. to substantial dryness, and final drying is effected at 100° C. (dry bulb temperature). The resulting film is clear and transparent.

Example IX

The following example illustrates the preparation of compositions composed of an intimate mixture of an interpolyamide with the typical prolamin zein, in which the protein comprises the major constituent.

Zein, to the extent of 145.5 parts, is dissolved in a mixture of 434 parts of chloroform and 116.2 parts of methanol and 138.8 parts of mixed amylbenzenesulfonamides is added as a plasticizing agent. This solution is added to a solution of an interpolyamide prepared from 40.9 parts of hexamethylenediamine adipate and 27.3 parts of epsilon-caprolactam dissolved in a mixture of 386 parts of chloroform and 110.1 parts of methanol. Films are cast from the resulting solution onto a smooth surface and dried at room temperature. The resulting films are transparent and show a high degree of tensile strength and good resistance to flexing, even after prolonged aging.

For some purposes useful results are obtained with proportions of protein of from 10% to 80% of the polyamide and protein mixture present in the composition. Generally, however, the protein constitutes from 40% to 60% of the polyamide-protein content. In the case of fibers and films the quantity of protein is usually from 15% to 70%.

The proteins useful in the practice of this invention also include the protamines, or strongly basic proteins; the histones, or moderately basic proteins; the scleroproteins, or animal connective tissue proteins; the keratins, the proteins of wool, hair, and horny tissues; and the chromoproteins, or blood pigment proteins.

Additional examples of proteins which may be employed in the practice of this invention include salmine; clupein; the globin from blood hemoglobin; egg albumin; serum globulin; edestin from hemp seed; wheat gliadin; hordein from barley; and oryzenin from rice. Collagen, the protein constituent of cartilage, bone, and fibrous connective tissue of animals; elastin, the protein of animal elastic fibers; wool; hair; horn; vitellin from egg yolk; and hemoglobin are also useful for the purposes of this invention.

Denatured proteins, i. e., those whose solubility is diminished in many of the solvents which ordinarily dissolve them, may also be successfully employed in the preferred procedures, although the number of suitable solvents is lessened. The alternative methods given below may also be used to prepare products of this invention comprising, in part, denatured proteins. Denatured edestin is a typical example of a denatured protein. Derived proteins, or proteins which have been partially hydrolyzed to simpler molecules, such as gelatin derived from collagen, also lie within the scope of this invention.

A wide variety of polyamides can be used in the practice of this invention. As examples of other simple polyamides of the diamine-dibasic acid type may be mentioned polytetramethylene sebacamide, polytetramethylene adipamide, polypentamethylene adipamide, polyhexamethylene sebacamide, polyoctamethylene adipamide, polydecamethylene adipamide, poly-p-xylylene sebacamide, polyhexamethylene hexahydroterephthalamide, poly-3-methyl hexamethylene-2-methyl adipamide, and polyhexamethylene isophthalamide. Simple polyamides of the amino acid type such as polymerized 6-aminocaproic acid, polymerized 9-aminononanoic acid, and polymerized 12-aminostearic acid can also be used.

Suitable interpolyamides other than those previously mentioned include polymers derived from hexamethylenediamine, decamethylenediamine, adipic acid, and sebacic acid; and polymers derived from hexamethylenediamine, adipic acid, and 12-aminostearic acid.

Polyamides which contain thioamide groups in the main chain of atoms and which can be used in making the present compositions include polyhexamethylene thioadipamide, polydecamethylene thiosebacamide, polydecamethylenethioterephthalamide, and polymerized 6-aminodithiocaproic acid.

Other suitable polymers which may be referred to as polyamides since they contain a plurality of amide or thioamide groups in the main chain of atoms are the synthetic linear polyureas, polycarbamates, and their sulfur containing analogs can also be used for the purposes of this invention. Typical examples of polyureas and polythioureas include polyhexamethyleneurea, polydecamethyleneurea, poly-m-phenyleneurea, the polyurea obtainable by heating a mixture of hexamethylenediamine and decamethylenediamine together with an equivalent quantity of urea, polyhexamethylenethiourea, and the polythiourea obtainable from hexamethylenediamine and decamethylene diisothiocyanate. Polyethylene (hexamethylene dicarbamate) and polyhexamethylene (decamethylene dithiocarbamate) are typical polycarbamates and polythiocarbamates.

As previously indicated the polyamides can contain other groupings in addition to the amide or thioamide groups in the main chain of atoms, such as the ester group, the ketone group, the sulfone group, the secondary amino or tertiary amino group, or sulfur atoms. Examples of polymers of this type are the polyamide-ester prepared from adipic acid, hexamethylenediamine, and ethylene glycol; the polyamide, polyhexamethylene 4-ketopimelamide; the polyamide prepared from hexamethylenediamine and sulfone dibutyric acid; the polyamide prepared from bis-hexamethylenetriamine and adipic acid; the polyamide derived from hexamethylenediamine and piperazine diacetic acid; and the polyamide, polyhexamethylene-3,3'-thiodibutyramide.

Plasticizers for the polyamide, the protein, or both, may be included in the present compositions for some uses although the products of this invention are characterized by high flexibility without the aid of plasticizers which may be undesirable as extraneous substances. The preferred plasticizing agents for compositions in which organic solvents are used are substances having one or more ring systems attached to phenolic hydroxyl groups, e. g., 1,12-di(4-hydroxyphenyl) octadecane, or aromatic sulfonamides. Glycerol is very useful in compositions comprising water-soluble proteins and water-soluble polyamides. The present compositions can when desired also include pigments, dyes, fillers, resins, antioxidants, agents to insolubilize or harden the protein, and agents for the modification of luster, either singly or in combination, as components of mixed compositions containing polyamides and proteins.

Methods other than those utilizing solution can be used in blending the proteins and polyamide. Intimate mixing can be accomplished by milling, either in the dry or wet state, or by heating to the melting point of one or more of the components of the mixture.

The temperatures preferred for mixing the protein and polyamide are from about 20° C. to 160° C. The blending, however, can be effected at temperatures substantially below this range, while the upper limit is dependent upon the point of decomposition of the protein or polyamide in question.

The new compositions described herein, due to their toughness, durability and flexibility, are useful for a large variety of purposes as for instance in plastics and coating compositions, and are particularly valuable in the form of films and fibers. These products retain their initial flexibility after the time at which the plasticized protein films become brittle. By means of this invention it is possible to utilize proteins as relatively cheap components in polyamide films and fibers and obtain products which not only are vastly superior to those made of protein alone but which equal and in some instances even surpass like products made from the polyamide alone.

As many apparently widely different embodiments of this invention may be made without departing from the spirit and scope thereof, it is to be understood that I do not limit myself to the specific embodiments thereof except as defined in the appended claims.

I claim:

1. A composition of matter comprising an intimate mixture of a protein and a synthetic linear polyamide, in which the protein is present in amount from about 10% to 80% of said mixture, said mixture being that obtained by blending solutions of the polyamide and protein and then removing the solvent, said polyamide being the reaction product of a linear polymer-forming composition comprising reacting material selected from at least one of the groups consisting of (a) monoaminomonocarboxylic acids, and (b) a mixture of a diamine and a dibasic carboxylic acid.

2. A composition of matter comprising an intimate mixture of a protein and a synthetic linear interpolyamide obtained from at least one diamine, at least one dicarboxylic acid and an amino acid, in which the protein is present in amount from about 10% to 80% of said mixture, said mixture being that obtained by blending solutions of the polyamide and protein and then removing the solvent.

3. A composition of matter comprising an intimate mixture of a protein and a synthetic linear interpolyamide obtained from hexamethylene diamine, adipic acid and 6-aminocaproic acid, in which the protein is present in amount from about 10% to 80% of said mixture, said mixture being that obtained by blending solutions of the polyamide and protein and then removing the solvent.

4. A composition of matter comprising an intimate mixture of a protein and a synthetic linear interpolyamide obtained from 60 parts hexamethylenediammonium adipate and 40 parts of 6-aminocaproic acid, in which the protein is present in amount from about 10% to 80% of said mixture, said mixture being that obtained by blending solutions of the polyamide and protein and then removing the solvent.

5. A composition of matter comprising an intimate mixture of gelatin and an interpolymer obtained from adipic acid, triglycoldiamine and hexamethylene diamine, in which the protein is present in amount from about 10% to 80% of said mixture, said mixture being that obtained by blending solutions of the polyamide and protein and then removing the solvent.

6. The composition set forth in claim 1 in which the protein is gelatin.

7. The composition set forth in claim 1 in which the protein is soya protein.

8. The composition set forth in claim 2 in which the protein is zein.

9. The composition set forth in claim 3 in which the protein is zein.

10. A coating composition comprising an intimate mixture of a protein and a synthetic linear polyamide, in which the protein is present in amount from about 10% to 80% of said mixture, said mixture being that obtained by blending solutions of the polyamide and protein and then removing the solvent, said polyamide being the reaction product of a linear polymer-forming composition comprising reacting material selected from at least one of the groups consisting of (a) monoaminomonocarboxylic acids, and (b) a mixture of a diamine and a dibasic carboxylic acid.

11. A self-supporting film comprising an intimate mixture of a protein and a synthetic linear polyamide, in which the protein is present in amount from about 15% to 70% of said mixture, said mixture being that obtained by blending solutions of the polyamide and protein and then removing the solvent, said polyamide being the reaction product of a linear polymer-forming composition comprising reacting material selected from at least one of the groups consisting of (a) monoaminomonocarboxylic acids, and (b) a mixture of a diamine and a dibasic carboxylic acid.

12. A fiber comprising an intimate mixture of a protein and a synthetic linear polyamide, in which the protein is present in amount from about 15% to 70% of said mixture, said mixture being that obtained by blending solutions of the polyamide and protein and then removing the solvent, said polyamide being the reaction product of a linear polymer-forming composition comprising reacting material selected from at least one of the groups consisting of (a) monoaminomonocarboxylic acids, and (b) a mixture of a diamine and a dibasic carboxylic acid.

13. The composition set forth in claim 1 in which said polyamide is a linear interpolyamide.

GEORGE DE WITT GRAVES.